Figure 1:
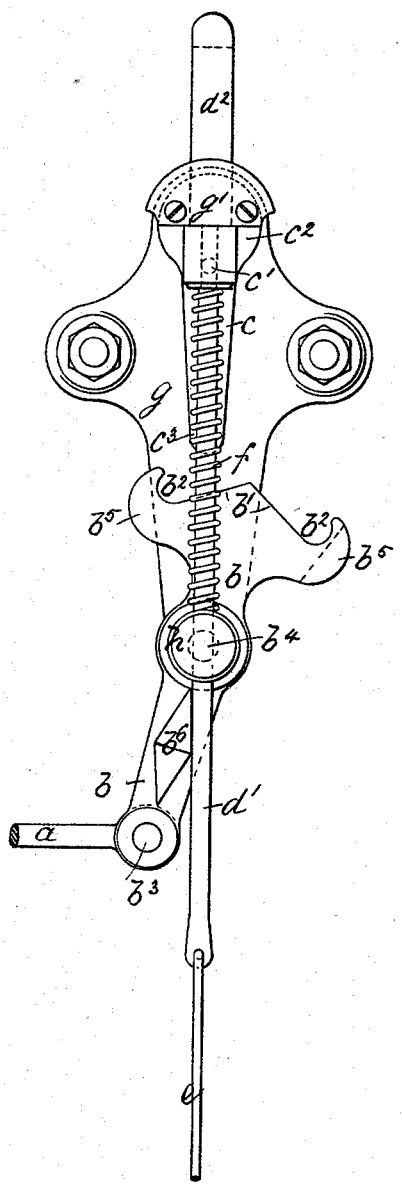

(No Model.)

L. ARMANNI.
BELT SHIPPER.

No. 527,190. Patented Oct. 9, 1894.

WITNESSES.      INVENTOR.

Charles Aubrey Day
Arthur Alexander Crozier.

Luigi Armanni

UNITED STATES PATENT OFFICE.

LUIGI ARMANNI, OF LONDON, ENGLAND.

BELT-SHIPPER.

SPECIFICATION forming part of Letters Patent No. 527,190, dated October 9, 1894.

Application filed July 10, 1894. Serial No. 517,136. (No model.)

*To all whom it may concern:*

Be it known that I, LUIGI ARMANNI, a subject of the King of Italy, residing at London, England, have invented a certain new and useful Belt-Shipper, of which the following is a specification.

This invention relates to improvements in belt shippers for shifting belts from and to the fast and loose pulleys of shafts transmitting motion to machinery. In a type of device used for such purpose, reverse actuating movements by the machine attendant are required for effecting the reverse operations of shifting the belt driving the machine from the loose pulley to the fast pulley of the driving shaft, and of shifting the belt from the fast pulley to the loose pulley for stopping the operation of the machine. It occasionally happens, from the necessity of this reverse actuation to effect said reverse operations, especially in the case of the breaking of a tool or other accident happening to the machine, when it is of extreme importance that its operation should be instantly stopped to prevent further injury accruing, that, from the operative's attention being arrested and particularly directed to the circumstances attending and the consequences attendant upon the accident, he loses valuable time, in the excitement of the moment, in his hesitancy as to the proper motion of the two to be given, to stop the operation of the machine. A commonly employed apparatus for such purpose consists of pendent levers which require to be shifted from side to side in reverse directions to effect the reverse operations, or of pendent rods which require to be turned about their axes in reverse directions to effect said reverse operations. Moreover, said levers and rods, being rigid and pendent, require that the machine should be vertically beneath the driving shaft so that they should be within reach of the operative, and hence they cannot be advantageously used in cases where, as frequently happens, the machine cannot be placed beneath, but has to be placed at a lateral distance from the driving shaft.

The object of this invention is to provide a belt shipping device of simple and effective construction in which but one and the same actuating motion is required to be given by the attendant, either to shift the belt so as to set the machine in operation or so as to stop the operation of the machine, so that the attendant can, at any time, have no hesitancy as to the proper actuating movement to be given, either to set the machine in operation or to stop its operation. Moreover, the improved apparatus is equally applicable whether the machine be situated immediately under or at a lateral distance from the driving shaft.

Figure 3:
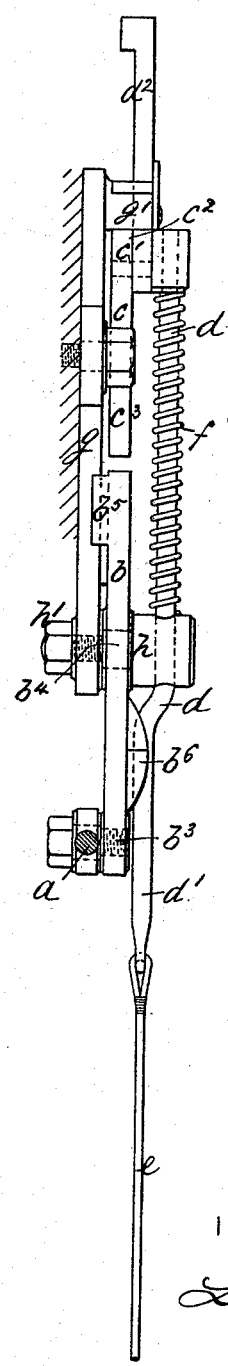
Figure 2:
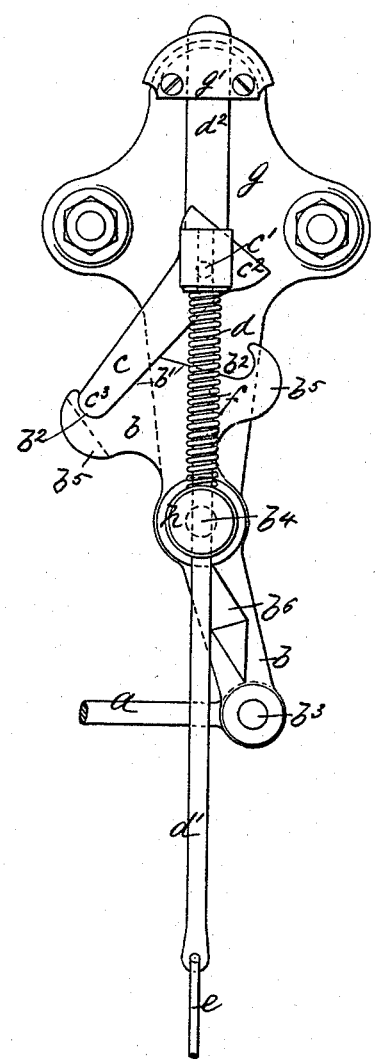

On the accompanying drawings:—Figure 1, represents the improved device in front elevation, out of operation. Fig. 2, represents the same in operation, and Fig. 3, represents a side elevation of Fig. 1.

In the improved device, the reverse motions of the belt shifting rod $a$, are effected by means of an oscillating lever $b$, the movements of which are effected by a pendent striker $c$, which is pivotally connected to a vertically reciprocating guided striker-rod $d$, to which operative motion is imparted by a flexible pendent connection $e$, requiring, at each operation, to be simply pulled downwardly by the operative, the recovery of the striker-rod and attached striker, after each such operation, being automatically effected by a spring $f$, which also positively insures the resetting of the striker in position for effecting the next succeeding shifting operation.

The apparatus may be conveniently supported by a hanger, or by a carrying plate $g$, attached to a hanger intermediate of the usual hangers supporting the counter or driving shaft.

The rod $a$, is connected at $b^3$, to the lever $b$, which is pivotally supported at $b^4$, by a shouldered pin $h$, carried by the hanger or plate $g$, and secured by a nut $h'$. The lever is formed with a double inclined part $b'$, the declivity of each incline terminating in a cup-like catch $b^2$. It is also formed with projections $b^5$, adapted, in each of its extreme positions (Figs. 1 and 2), to abut against the plate $g$, and arrest the lever. It is also provided with a projection $b^6$, adapted, in each of its extreme positions, to engage with an incurved part $d'$, of the striker rod when in its normal position (Figs. 1 and 3) and lock the lever until its next actuation by the attendant, so that any tendency of the belt to shift the lever is effectively neutralized.

The striker $c$, is pivotally connected at $c'$, to the rod $d$, vertically above the pivot $b^4$, of the lever $b$, and is pendent from said connection $c$ and normally hangs over (Fig. 1.) one or other of the inclined parts $b'$, of the lever so as to be operative in reversing the position of the latter (Fig. 2) each time it is pulled down by the attendant, so that following actuations of the apparatus by the attendant will reverse the lateral deviation of the lever, and consequently, will respectively shift the belt to and from the fast pulley. The upper end $c^2$, of the striker is flattened and abuts against a projecting part $g'$, of the plate $g$, so as to be caused to resume its vertically pendent position (Fig. 1) each time the spring $f$, returns the rod $d$, to its normal position. The lower end $c^3$, of the striker may be fitted with a runner-wheel to facilitate its traverse down the inclines and engagement with the cup-like catches of the lever.

The striker-rod $d$, or a connected extension $d^2$, thereof is suitably guided by the part $g'$, and at its lower end by the head of the pin $h$, and it is surrounded by a helical spring $f$, which automatically returns it to its normal position ready for the next operation, immediately upon being released from the pull of the attendant.

The pendent connection $e$, from the rod $d$, to the attendant being flexible (it may consist simply of a cord and convenient handle) permits of the device being applied with equal advantage whether the machine be situated either immediately under or at a lateral distance from the driving shaft, as, in the former case, the cord depends to a convenient position for use, and, in the latter case, it can be guided to such position by a pulley supported in a line with the rod $d$, and by another pulley supported above the machine.

The striker may be arranged to act upon a lower part of the oscillating lever, the upper end of the latter being connected to the belt shifting rod.

I claim as my invention—

1. In a belt shipper, the combination with a hanger, a belt shifting rod, and an oscillating lever connected to the latter and pivoted to the hanger, of a striker-rod adapted for longitudinal movement on the hanger, a pendent striker pivoted to said rod above the oscillating lever and adapted to cooperate therewith to reverse its position, a connection for operating the striker-rod and striker and a spring serving to return said rod to its normal position when said connection is released, substantially as set forth.

2. In a belt shipper; in combination;—a belt shifting rod; an oscillating lever connected thereto and formed with a double inclined and catch ended part; a guide rod adapted for longitudinal movement a pendent striker pivotally connected to the guided rod and adapted at each descent to engage with and reverse the position of the lever; a connection for operating the rod and striker by pulling thereon; and a spring for automatically returning the rod and striker when said connection is released;—as set forth.

3. In a belt shipper, the combination with a hanger or carrying plate, a lever formed with a double inclined part as $b'$, terminating in cup-like catches and provided with a projection as $b^6$ and pivotally supported on the carrying plate by a shoulder pin, of a striker-rod, guided in the hanger plate and said shoulder pin and having an incurved part as $d'$, a spring surrounding the striker-rod, a striker pivotally connected to said rod and adapted to cooperate with the inclined part of the lever, a belt shifting rod connected to said lever and a flexible pendant connected to the striker rod, substantially as set forth.

4. In a belt shipper, the combination with a hanger provided with a projecting part $g'$ at its top and an oscillating lever connected to said hanger and formed with projections as $b^5$, of a striker-rod guided in said hanger, a pendent striker having a flattened upper end and pivotally connected to the striker-rod above said lever and adapted to cooperate with the latter, a belt shifting rod connected to the oscillating lever, a spring applied to the striker-rod and a pendent cord connected to said rod, substantially as set forth.

Signed at London, England, this 29th day of June, 1894.

LUIGI ARMANNI.

Witnesses:
CHARLES AUBREY DAY,
ARTHUR ALEXANDER CROZIER.